(12) United States Patent
Lee

(10) Patent No.: US 7,599,017 B2
(45) Date of Patent: Oct. 6, 2009

(54) LIQUID CRYSTAL DISPLAYING MONITOR WITH DETACHABLE BACKLIGHT AND LIQUID CRYSTAL DISPLAYING TELEVISION WITH DETACHABLE BACKLIGHT

(75) Inventor: Yu-Tuan Lee, Taipei (TW)

(73) Assignee: Gigno Technology Co., Ltd., Taipei (TW)

( * ) Notice: Subject to any disclaimer, the term of this patent is extended or adjusted under 35 U.S.C. 154(b) by 515 days.

(21) Appl. No.: 11/037,006

(22) Filed: Jan. 19, 2005

(65) Prior Publication Data

US 2005/0259192 A1    Nov. 24, 2005

(30) Foreign Application Priority Data

May 19, 2004    (TW) ............................. 93114175 A

(51) Int. Cl.
G02F 1/1333 (2006.01)
H04N 5/64 (2006.01)
G02F 1/13357 (2006.01)

(52) U.S. Cl. .................. 349/58; 348/794; 362/97.2; 349/70

(58) Field of Classification Search .................. 349/58; 362/632–634, 97.1, 97.2, 97.3, 97.4; 348/790–795
See application file for complete search history.

(56) References Cited

U.S. PATENT DOCUMENTS 5,119,204 A * 6/1992 Hashimoto et al. .......... 348/794
5,432,626 A * 7/1995 Sasuga et al. ................. 349/58
5,574,477 A * 11/1996 Shimizu et al. ............. 345/102
5,659,376 A * 8/1997 Uehara et al. ................. 349/58
5,748,269 A * 5/1998 Harris et al. .................. 349/58
6,104,451 A * 8/2000 Matsuoka et al. ............ 349/58
6,130,658 A * 10/2000 Yamamoto et al. .......... 345/102
6,187,394 B1 * 2/2001 Johnson et al. ............... 428/13
6,295,103 B1 * 9/2001 Yamatani et al. ............. 349/58
6,559,908 B2 * 5/2003 Hiratsuka et al. ............ 349/58
2004/0109095 A1 * 6/2004 Chou ......................... 348/790
2004/0119907 A1 * 6/2004 Ahn ............................ 349/58

* cited by examiner

Primary Examiner—Andrew Schechter
(74) Attorney, Agent, or Firm—Birch, Stewart, Kolasch & Birch, LLP

(57) ABSTRACT

A liquid crystal displaying device has an exterior housing. The liquid crystal displaying device comprises a liquid crystal displaying unit and a backlight unit. The liquid crystal displaying unit includes a frame, a liquid crystal displaying panel and a driving control circuit. The frame is arranged around the periphery of the liquid crystal displaying panel. The liquid crystal displaying panel has a displaying side. The driving control circuit is set inside the frame and is electrically connected to the liquid crystal displaying panel. The backlight unit includes a shell, at least one light-emitting element, and a power driver for driving the light-emitting element. The light-emitting element and the power driver are installed inside the shell, while the shell is assembled with the frame, such that the backlight unit is positioned at the side opposite to the displaying side of the liquid crystal displaying panel. The shell of the backlight unit and the frame of the liquid crystal displaying unit form the exterior housing of the liquid crystal displaying device.

24 Claims, 7 Drawing Sheets

LIQUID CRYSTAL DISPLAYING MONITOR WITH DETACHABLE BACKLIGHT AND LIQUID CRYSTAL DISPLAYING TELEVISION WITH DETACHABLE BACKLIGHT

BACKGROUND OF THE INVENTION

1. Field of Invention

The invention relates to a displaying device and, in particular, to a liquid crystal displaying device with a backlight unit.

2. Related Art

Regarding to the application fields, the liquid crystal displaying devices are used for monitors or televisions. In fact, the structures of the liquid crystal displaying devices used for monitors and televisions are similar, and only different in several components, circuits and the layout of some components.

With reference to FIG. 1, a conventional liquid crystal displaying device 1 includes a liquid crystal displaying (LCD) panel 11, a backlight unit 12, a driving circuit 13, a control circuit 14, a first shell 15, a second shell 16, and a stand 17.

As shown in FIG. 1, the liquid crystal displaying panel 11 at least includes a liquid crystal layer 111, a color filter substrate 112, a thin film transistor (TFT) circuit substrate 113, and two polarizers 114 and 115. The liquid crystal layer 111 is disposed between the color filter substrate 112 and the TFT circuit substrate 113. The polarizer 114 is disposed at one side of the color filter substrate 112, while the polarizer 115 is disposed at one side of the TFT circuit substrate 113.

Referring to FIG. 1 again, the backlight unit 12 includes a lamp case 121 and a power driver 122 for driving lamps. The lamp case 121 at least includes a plurality of lamps 120 and a diffuser 124.

The driving circuit 13 electrically connects to the LCD panel 11 for driving the LCD panel 11. In general, the driving circuit 13 is composed of a plurality of driving ICs 131 and at least one driving circuit board 132.

The control circuit 14 is used for controlling the driving circuit 13 so as to control the LCD panel 11. The control circuit 14 and the power driver 122 are commonly installed at one side of the lamp case 121. The lamp case 121 is positioned adjacent to the LCD panel 11, so that the lamps 120 of the lamp case 121 can illuminate the LCD panel 11.

As shown in FIG. 1, the LCD panel 11, backlight unit 12, driving circuit 13 and control circuit 14 are encapsulated with the first shell 15 and the second shell 16. Herein, the second shell 16 connects to the stand 17.

In view of the above-mentioned liquid crystal displaying device 1, a plurality of lamps 120 are installed in the lamp case 121, and are usually cold cathode fluorescent lamps (CCFL). Due to the variation of lifetime and quality among CCFLs, if any one of the lamps 120 malfunctions, the entire backlight unit 12 may cause problems with providing illumination. The worst case would be the whole liquid crystal displaying device must be discarded. For solving this problem, a lamp case 121 with special structure is invented recently, which makes it possible to replace one single lamp 120 within the invented lamp case. This structure might provide the solution for replacing the lamp 120, however, it still cannot solve other two problems. The first problem is that since there are a plurality of lamps 120 installed in the lamp case 121, there's loss of uniformity between the brightness of the newer lamp(s) 120 and the brightness of older lamps 120 once after one or two lamps 120 are replaced. Regarding to the second problem, since the LCD panel 11, backlight unit 12, driving circuit 13 and control circuit 14 are encapsulated with the first shell 15 and second shell 16, the first shell 15 and second shell 16 must be disassembled before replacing the lamp(s) 120. In some cases, the control circuit 14 and power driver 122 must also be uninstalled before replacing the lamp (s) 120. The disassembling or uninstalling process might be simple for the professionals, but for the general users, it could be very difficult. Not to mention this process may cause damage to the products. On the other hand, since the lamps are driven by high voltage, it is not safe for the users to perform the above-mentioned process themselves.

Regarding to the above-mentioned descriptions, the CCFL is just one example of the light-emitting element used for the backlight unit. To be general, the light-emitting element of the backlight unit can be a light-emitting diode (LED) or a flat fluorescent lamp (FFL).

Therefore, it is an important subject of the invention to provide a liquid crystal displaying device, which can facilitate the replacement of light-emitting elements of the backlight unit, retain the brightness uniformity of the backlight unit, and the lifetime thereof.

SUMMARY OF THE INVENTION

In view of the foregoing, the invention is to provide a liquid crystal displaying device, which is easily assembled and disassembled.

To achieve the aforementioned, a liquid crystal displaying device of the invention has an exterior housing and comprises a liquid crystal displaying unit and a backlight unit. The liquid crystal displaying unit includes a frame, a liquid crystal displaying panel and a driving control circuit. The frame is arranged around the periphery of the liquid crystal displaying panel. The liquid crystal displaying panel has a displaying side. The driving control circuit is mounted inside the frame and is electrically connected to the liquid crystal displaying panel. The backlight unit includes a shell, at least one light-emitting element, and a power driver for driving the light-emitting element. The light-emitting element and the power driver are installed inside the shell, and the shell is assembled with the frame in a way so as to put the backlight unit at the side opposite to the displaying side of the liquid crystal displaying panel. Thus, the shell of the backlight unit and the frame of the liquid crystal displaying unit form the exterior housing of the liquid crystal displaying device.

As mentioned above, since the light-emitting element and power driver of the invention are installed inside the shell of the backlight unit, the backlight unit becomes one individual assembled/disassembled unit. Therefore, the users can assemble/disassemble the backlight unit by themselves. In other words, it is not necessary for the users to replace each light-emitting element, but the entire backlight unit. Accordingly, the brightness uniformity of the backlight unit can be retained as well as the lifetime of the liquid crystal displaying device.

BRIEF DESCRIPTION OF THE DRAWINGS

The invention will become more fully understood from the detailed description given hereinafter by way of illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements. In the following embodiment, an LCD TV is taken as an example of the liquid crystal displaying device.

Figure 1:
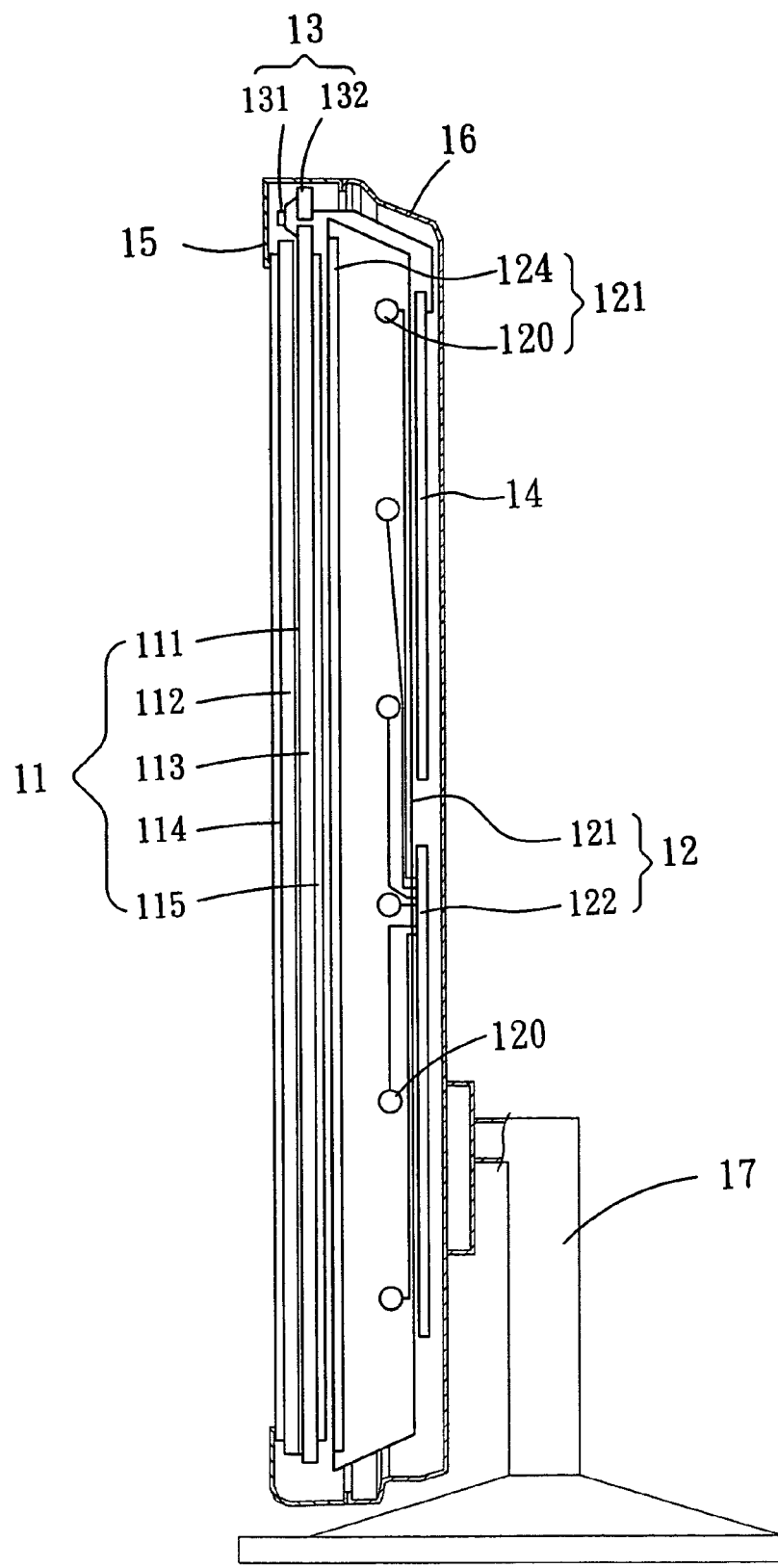
FIG. 1 is a schematic sectional side view of the conventional liquid crystal displaying device.
Figure 2:
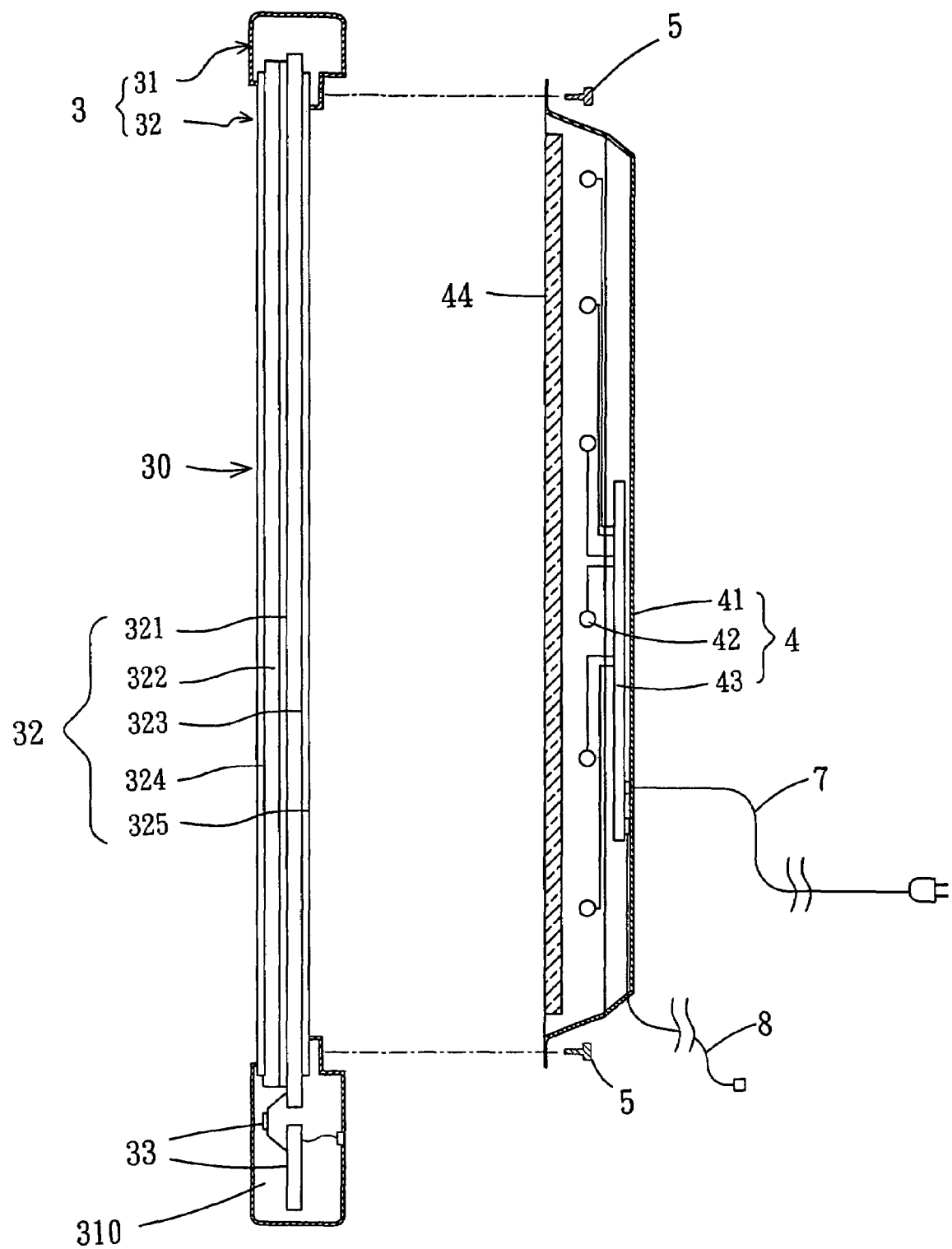
FIG. 2 is an exploded side view of a liquid crystal displaying device according to a preferred embodiment of the invention.

With reference to FIG. 2, a liquid crystal displaying device of the invention comprises a liquid crystal displaying unit 3 and a backlight unit 4.

As shown in FIG. 2, the liquid crystal displaying unit 3 comprises a frame 31, a liquid crystal displaying panel 32, and a driving control circuit 33.

Figure 6:
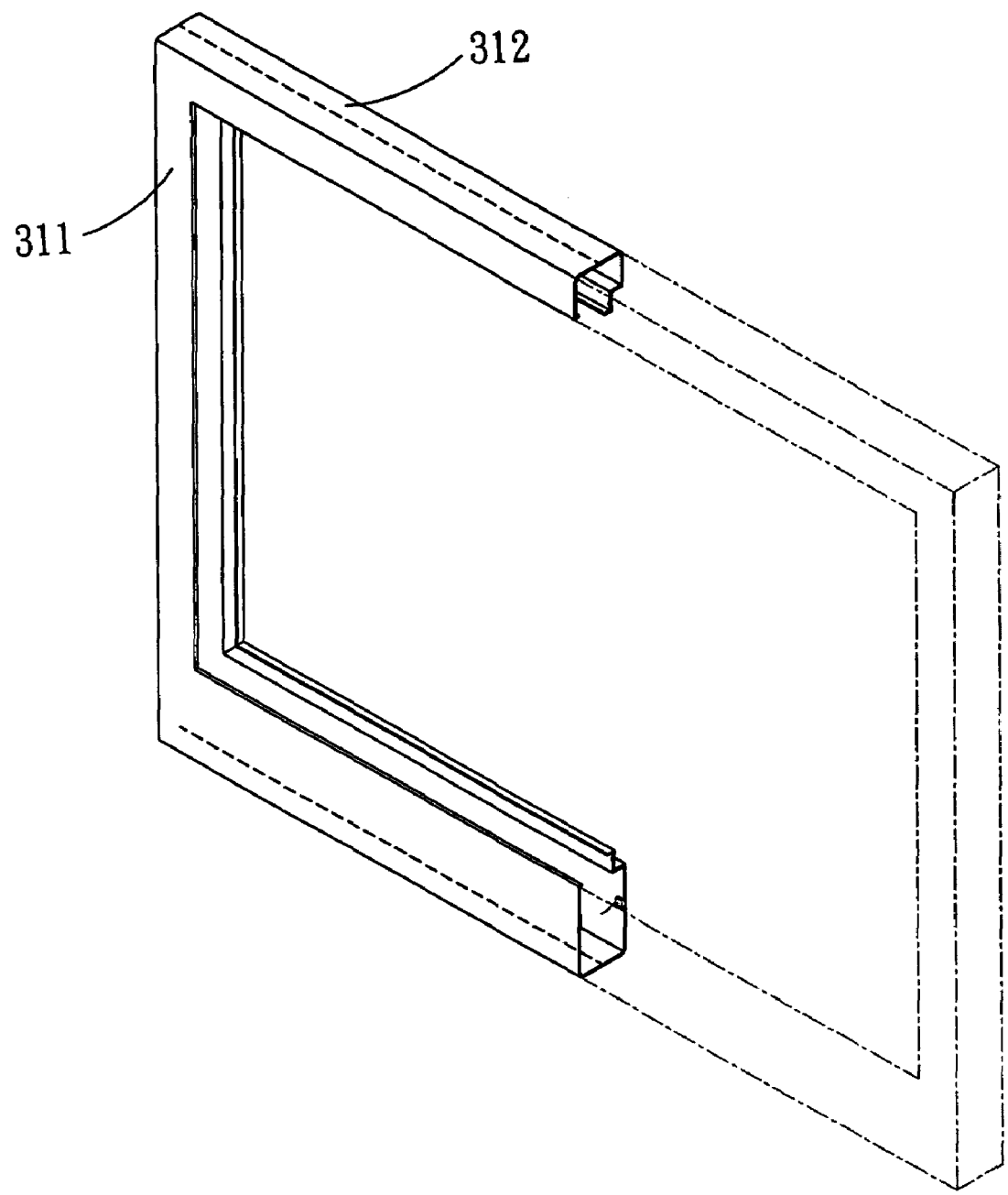
FIG. 6 is a three-dimensional sectional view showing a frame of a liquid crystal displaying unit according to the embodiment of the invention.

The frame 31 is arranged around the periphery of the liquid crystal displaying panel 32. In the present embodiment, the frame 31 can be integrally formed or include a first frame portion 311 and a second frame portion 312 (as shown in FIG. 6). The liquid crystal displaying panel 32 at least comprises a liquid crystal layer 321, a color filter substrate 322, a thin film transistor (TFT) circuit substrate 323, and two polarizers 324 and 325. The liquid crystal layer 321 is disposed between the color filter substrate 322 and the TFT circuit substrate 323. The polarizer 324 is disposed at one side of the color filter substrate 322, and the polarizer 325 is disposed at one side of the TFT circuit substrate 323. Herein, the polarizer 324 is disposed at a displaying side 30 of the liquid crystal displaying panel 32. The driving control circuit 33 electrically connects to the TFT circuit substrate 323 of the liquid crystal displaying panel 32, and is used to drive and control the liquid crystal displaying panel 32. The driving control circuit 33 is located in an accommodating space 310 of the frame 31 of the liquid crystal displaying unit 3.

The backlight unit 4 comprises a shell 41, at least one light-emitting element 42, and a power driver 43 for driving the light-emitting element 42. The light-emitting element 42 and the power driver 43 are installed inside the shell 41, and the shell 41 is assembled with the frame 31. Accordingly, the backlight unit 4 is positioned at the side opposite to the displaying side 30 of the liquid crystal displaying panel 32. Of course, the backlight unit 4 may further comprise other optical components such as a diffuser 44. In this case, the light emitted from the light-emitting element 42 can be projected on the liquid crystal displaying unit 3 via the optical components, such as the diffuser 44. In the current embodiment, the light-emitting element of the backlight unit is a cold cathode fluorescent lamp (CCFL). In general, the light-emitting element of the backlight unit can be a light-emitting diode (LED) or a flat fluorescent lamp (FFL).

Figure 3:
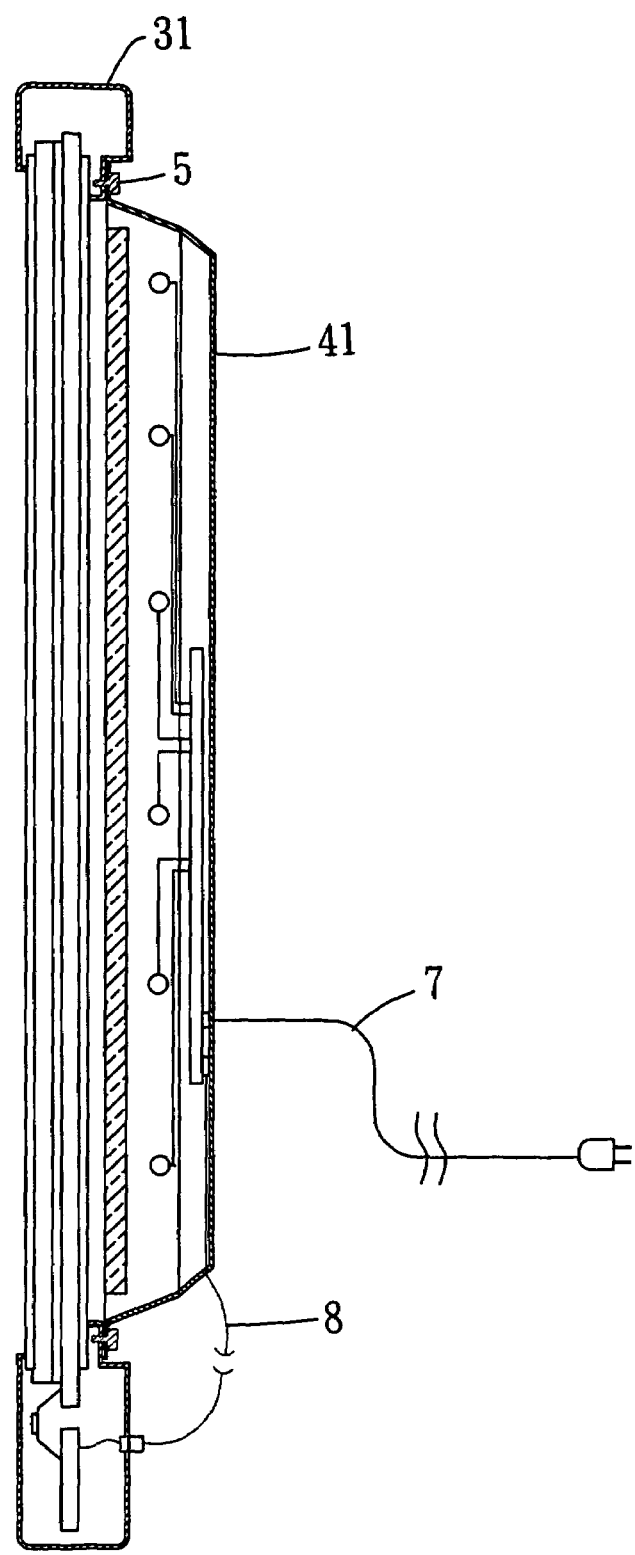
FIG. 3 is an assembled side view of the liquid crystal displaying device as shown in FIG. 2.
Figure 4:
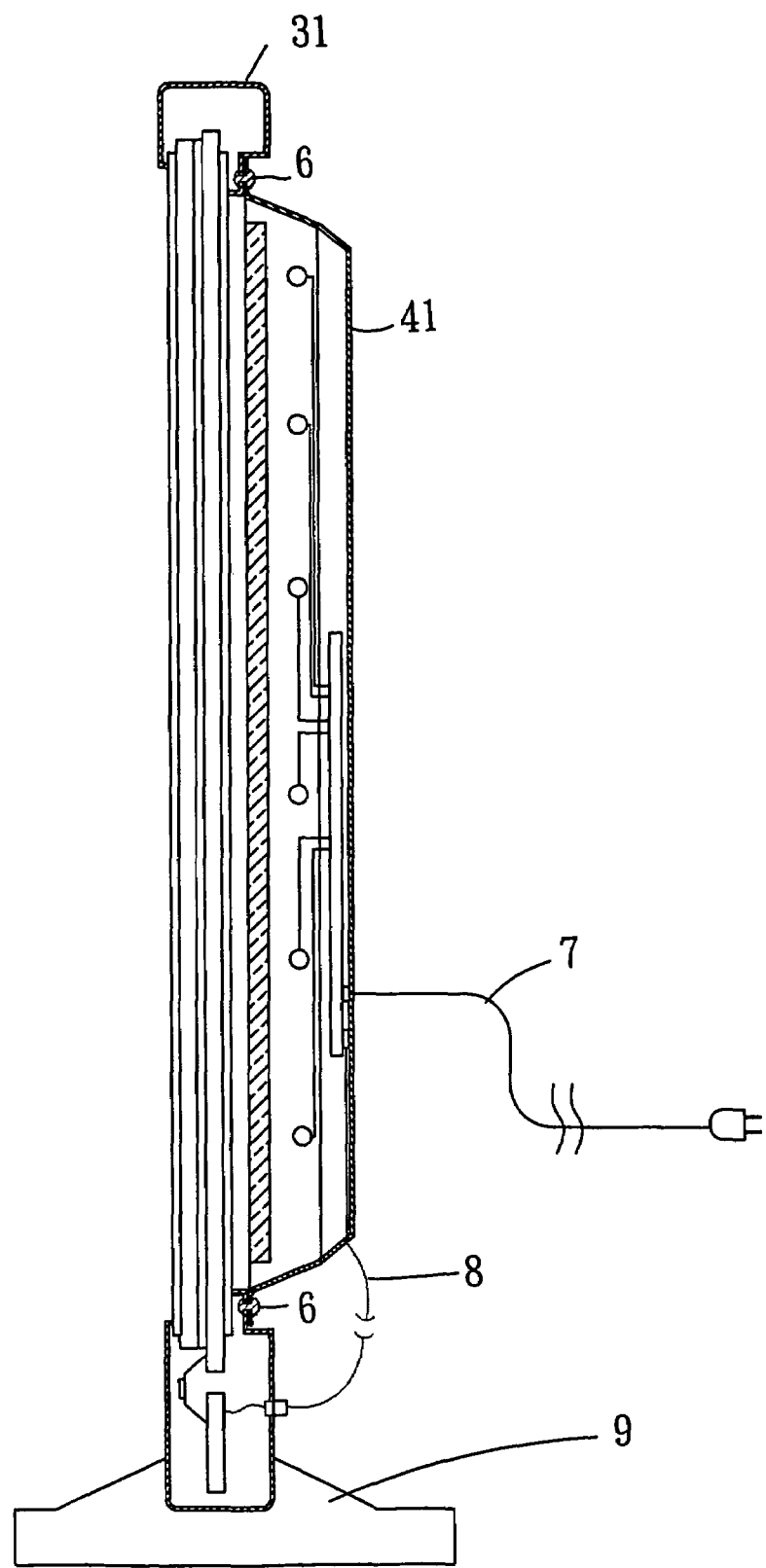
FIG. 4 is an assembled side view of a liquid crystal displaying device according to another embodiment of the invention.
Figure 5:
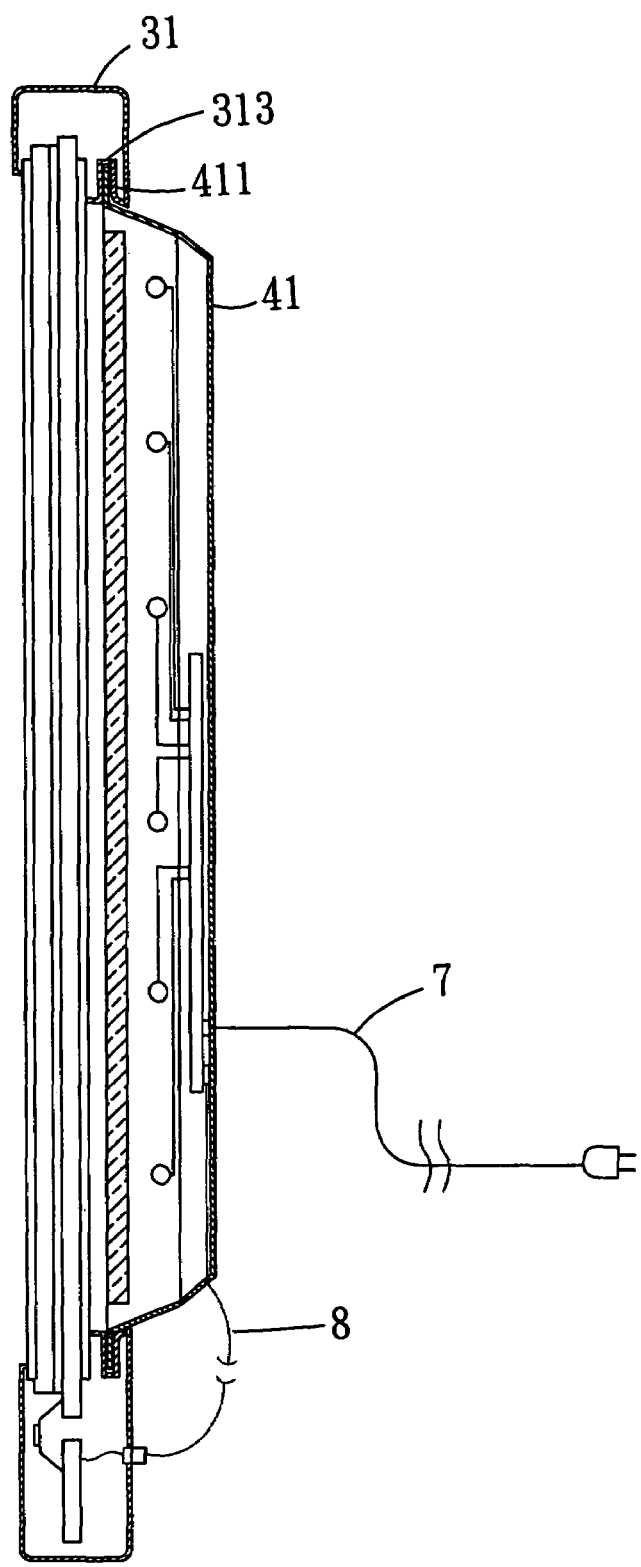
FIG. 5 is an assembled side view of a liquid crystal displaying device according to an additional embodiment of the invention.
Figure 7:
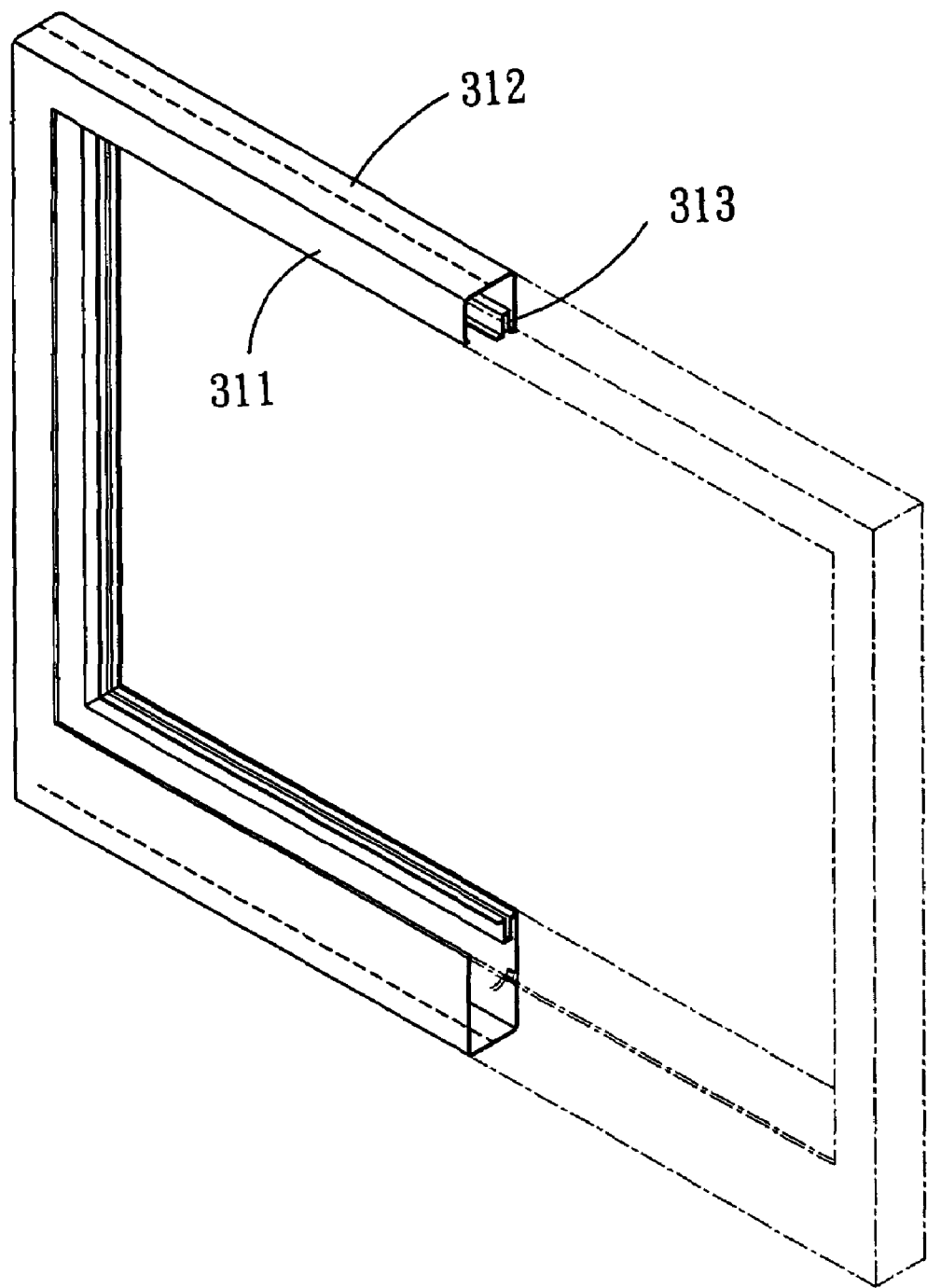
FIG. 7 is a three-dimensional sectional view showing another frame of the liquid crystal displaying unit according to the embodiment of the invention.

With reference to FIGS. 2 and 3, the frame 31 and the shell 41 of the backlight unit 4 are connected to each other with screw-connecting components 5. Thus, the backlight unit 4 can be assembled with the frame 31. Herein, as shown in FIG. 6, if the frame 31 comprises a first frame portion 311 and a second frame portion 312, the screw-connecting components 5 are used to connect the shell 41 and the second frame portion 312 so as to assemble the backlight unit 4 and the frame 31. Certainly, except the screw connection method, the liquid crystal displaying unit 3 and the backlight unit 4 can be connected with at least one riveting component 6 (as shown in FIG. 4). In this case, the riveting components 6 are used to connect the frame 31 and the shell 41 of the backlight unit 4 so as to assemble the backlight unit 4 and the frame 31. Alternatively, as shown in FIG. 5, the frame 31 may further comprise a first connecting portion 313, and the shell 41 of the backlight unit 4 has a second connecting portion 411 opposite to the frame 31. When the first connecting portion 313 connects with the second connecting portion 411, the backlight unit 4 and the frame 31 are assembled. Herein, as shown in FIG. 7, if the frame 31 comprises a first frame portion 311 and a second frame portion 312, the first connecting portion 313 is disposed on the second frame portion 312 of the frame 31. To be noted, the above-mentioned methods for assembling the liquid crystal displaying unit 3 and the backlight unit 4 are only taken as examples, so there are other connecting methods which can also be used to assemble the liquid crystal displaying unit 3 and backlight unit 4.

Referring to FIGS. 2 to 5, the backlight unit 4 may further comprise a power cable 7 and a signal connecting line 8. One end of the power cable 7 electrically connects to the power driver 43, and the other end of the power cable 7 electrically connects to an external power source (not shown) or the liquid crystal displaying unit 3. Besides, one end of the signal connecting line 8 electrically connects to the power driver 43, and the other end of the signal connecting line 8 electrically connects to the driving control circuit 33.

As mentioned above, whichever connecting method is used to assemble the liquid crystal displaying unit 3 and the backlight unit 4, the frame 31 of the liquid crystal displaying unit 3 and the shell 41 of the backlight unit 4 can be assembled to form the exterior housing of the liquid crystal displaying device of the invention.

Finally, as shown in FIG. 4, the liquid crystal displaying device of the invention may further comprise a stand 9, which connects to the frame 31. Thus, the liquid crystal displaying device of the invention can stand on, for example, a table with the stand 9. To be noted, since the stand 9 is connected to the frame 31, it would not interfere with the assembling or disassembling of the backlight unit 4.

In summary, since the light-emitting element and power driver of the invention are installed inside the shell of the backlight unit to make the backlight unit an individual assembled/disassembled unit, the users can assemble/disassemble the backlight unit by themselves. In other words, it is not necessary for the users to replace the defective light-emitting element, but the entire backlight unit. Thus, the brightness uniformity of the backlight unit can be retained as well as the lifetime of the liquid crystal displaying device. To elaborate on the benefits of having the light-emitting element and power driver of the invention installed inside the shell of the backlight unit in order to make the backlight unit an individual assembled/disassembled unit, when the liquid crystal displaying unit functions well but only the light-emitting element of the backlight unit is out of order, the users can plainly replace the backlight unit. Accordingly, the lifetime of the liquid crystal displaying device is prolonged.

Although the invention has been described with reference to specific embodiments, this description is not meant to be construed in a limiting sense. Various modifications of the disclosed embodiments, as well as alternative embodiments, will be apparent to one of ordinary skill in the art. It is, therefore, contemplated that the appended claims will cover all modifications that fall within the true scope of the invention.

What is claimed is:

1. A liquid crystal displaying monitor, which has an exterior housing, comprising:
   a liquid crystal displaying unit, which comprises a frame, a liquid crystal displaying panel and a driving control circuit, wherein the frame is disposed along the periphery of the liquid crystal displaying panel, the liquid crystal displaying panel has a displaying side, and the driving control circuit is set inside the frame and is electrically connected to the liquid crystal displaying panel;
   a backlight unit, which comprises a shell, at least one light-emitting element, and a power driver for driving the light-emitting element, wherein the light-emitting element and the power driver are installed within a volume defined by the shell, the shell is assembled with the frame such that the backlight unit is positioned at the side opposite to the displaying side of the liquid crystal displaying panel, and the shell of the backlight unit and the frame of the liquid crystal displaying unit together form the exterior housing of the liquid crystal displaying monitor; and
   a stand, which supports the frame and is directly connected to the frame and is not directly connected to the backlight unit.

2. The liquid crystal displaying monitor of claim 1, wherein the frame comprises a first frame portion and a second frame portion, and the first frame portion and the second frame portion connect with each other to form an accommodating space.

3. The liquid crystal displaying monitor of claim 2, wherein the driving control circuit is disposed in the accommodating space and electrically connects to the liquid crystal displaying panel for driving and controlling the liquid crystal displaying panel.

4. The liquid crystal displaying monitor of claim 1, further comprising:
   at least one screw-connection component, which connects the frame to the shell of the backlight unit such that the backlight unit is assembled with the frame.

5. The liquid crystal displaying monitor of claim 4, wherein the frame comprises a first frame portion and a second frame portion, and the screw-connection component connects the second frame portion of the frame to the shell of the backlight unit such that the backlight unit is assembled with the second frame portion of the frame.

6. The liquid crystal displaying monitor of claim 1, wherein the frame further comprises a first connecting portion, the shell of the backlight unit has a second connecting portion opposite to the frame, and the first connecting portion connects with the second connecting portion for assembling the backlight unit and the frame.

7. The liquid crystal displaying monitor of claim 6, wherein the frame comprises a first frame portion and a second frame portion, and the first connecting portion is disposed on the second frame portion.

8. The liquid crystal displaying monitor of claim 1, further comprising:
   at least one riveting component, which connects the frame to the shell of the backlight unit such that the backlight unit is assembled with the frame.

9. The liquid crystal displaying monitor of claim 8, wherein the frame comprises a first frame portion and a second frame portion, and the riveting component connects the second frame portion of the frame to the shell of the backlight unit such that the backlight unit is assembled with the second frame portion of the frame.

10. The liquid crystal displaying monitor of claim 1, wherein the backlight unit is a direct backlight unit.

11. The liquid crystal displaying monitor of claim 1, wherein the backlight unit further comprises a power cable, and one end of the power cable electrically connects to the power driver.

12. The liquid crystal displaying monitor of claim 11, wherein the other end of the power cable electrically connects to an external power source.

13. The liquid crystal displaying monitor of claim 11, wherein the other end of the power cable electrically connects to the liquid crystal displaying unit.

14. The liquid crystal displaying monitor of claim 1, further comprising a signal connecting line, wherein one end of the signal connecting line electrically connects to the power driver, and the other end of the signal connecting line electrically connects to the driving control circuit.

15. The liquid crystal displaying monitor of claim 1, wherein the light-emitting element is a cold cathode fluorescent lamp (CCFL).

16. The liquid crystal displaying monitor of claim 1, wherein the light-emitting element is a flat fluorescent lamp (FFL).

17. The liquid crystal displaying monitor of claim 1, wherein the light-emitting element is a light-emitting diode (LED).

18. The liquid crystal displaying monitor of claim 1, wherein the backlight unit is an individual assembled/disassembled unit, and the backlight unit for being replaced entirely is disassembled from the exterior housing of the liquid crystal displaying monitor.

19. A liquid crystal displaying television, which has an exterior housing, comprising:
   a liquid crystal displaying unit, which comprises a frame, a liquid crystal displaying panel and a driving control circuit, wherein the frame is disposed along the periphery of the liquid crystal displaying panel, the liquid crystal displaying panel has a displaying side, and the driving control circuit is set inside the frame and is electrically connected to the liquid crystal displaying panel;
   a backlight unit, which comprises a shell, at least one light-emitting element, and a power driver for driving the light-emitting element, wherein the light-emitting element and the power driver are installed within a volume defined by the shell, the shell is assembled with the frame such that the backlight unit is positioned at the side opposite to the displaying side of the liquid crystal displaying panel, and the shell of the backlight unit and the frame of the liquid crystal displaying unit together form the exterior housing of the liquid crystal displaying television; and
   a stand, which supports the frame and is directly connected to the frame and is not directly connected to the backlight unit.

20. The liquid crystal displaying television of claim 19, wherein the frame comprises a first frame portion and a second frame portion, and the first frame portion and the second frame portion connect with each other to form an accommodating space.

21. The liquid crystal displaying television of claim 20, wherein the driving control circuit is disposed in the accommodating space and electrically connects to the liquid crystal displaying panel for driving and controlling the liquid crystal displaying panel.

22. The liquid crystal displaying television of claim 19, further comprising: at least one screw-connection component, which connects the frame to the shell of the backlight unit such that the backlight unit is assembled with the frame.

23. The liquid crystal displaying television of claim 19, wherein the frame further comprises a first connecting portion, the shell of the backlight unit has a second connecting portion opposite to the frame, and the first connecting portion connects with the second connecting portion for assembling the backlight unit and the frame.

24. The liquid crystal displaying-television of claim 19, further comprising: at least one riveting component, which connects the frame to the shell of the backlight unit such that the backlight unit is assembled with the frame.

\* \* \* \* \*